United States Patent [19]

Drexhage et al.

[11] 4,212,519

[45] Jul. 15, 1980

[54] LIGHT CONTROL DEVICE AND FABRICATION METHODS THEREFOR

[75] Inventors: Karl H. Drexhage; Joseph J. Wrobel, both of Rochester, N.Y.

[73] Assignee: Eastman Kodak Company, Rochester, N.Y.

[21] Appl. No.: 882,514

[22] Filed: Mar. 1, 1978

[51] Int. Cl.$^2$ ............................................. G02F 1/28
[52] U.S. Cl. ..................................... 350/362; 350/267
[58] Field of Search ............... 350/267, 362, 150, 151

[56] References Cited

U.S. PATENT DOCUMENTS

| | | | |
|---|---|---|---|
| 2,290,581 | 7/1942 | Donal, Jr. | 350/267 |
| 3,257,903 | 6/1966 | Marks | 350/267 |
| 3,512,876 | 5/1970 | Marks | 350/267 |
| 3,527,525 | 9/1970 | Marks | 350/267 |
| 4,125,319 | 11/1978 | Frank et al. | 350/362 |

OTHER PUBLICATIONS

Research Disclosure (Mar. 1977), No. 155, pp. 64–71.

*Primary Examiner*—William L. Sikes
*Attorney, Agent, or Firm*—John D. Husser

[57] ABSTRACT

Light-control devices of the type having field-orientable, light-control elements supported in a solid elastomeric matrix are constructed in a manner providing improved uniformity in light-control and, in image display uses, improved resolution and contrast. Features of the improved construction include predetermined physical characteristics such as size, shape and/or location of the light-control elements within the matrix. Various methods for achieving such constructions include the steps of forming the desired array of elements and disposing the array in the matrix with relative positions of the elements maintained.

27 Claims, 2 Drawing Figures

LIGHT CONTROL DEVICE AND FABRICATION METHODS THEREFOR

CROSS REFERENCE TO RELATED APPLICATIONS

Reference is made herein to U.S. application Ser. No. 682,305 entitled ACTIVE LIGHT CONTROL DEVICE and filed Mar. 3, 1976 in the names of L. F. Frank and J. Y. Kaukeinen and now U.S. Pat. 4,125,319.

BACKGROUND OF THE INVENTION

1. Field of the Invention

The present invention relates to light-control devices and to methods of fabricating such devices (the term "light" being used herein to refer in the generic sense to visible light and infrared, ultraviolet and microwave radiation in neighboring portions of the electromagnetic spectrum). More particularly the present invention relates to light-control devices in which small light-control elements are selectively oriented by an electric or magnetic field, and to methods of manufacturing such devices.

2. Description of the Prior Art

Various field-addressable devices have been proposed for selectively controlling incident light (e.g., regulating its transmission, reflection, diffraction or absorption). The present invention pertains to active devices of this type (i.e., capable of rapid and recurring changes in light-control effect) as opposed to inactive devices (i.e., primarily intended for a relatively permanent light-control effect). Such active light-control devices have various applications, e.g., light modulators, display screens, image converters or image intensifiers.

U.S. Pat. No. 2,290,581 discloses an early electro-optic converter in which graphite or aluminum particles, suspended in a liquid medium, are selectively aligned by a scanning electron-gun to modulate the passage of light and provide a viewable image. Similar light-control devices, using dipole particles in liquid suspension and electric orienting fields, are disclosed in U.S. Pat. Nos. 3,257,903; 3,512,876 and 3,527,525.

Such prior art approaches present certain difficulties or disadvantages, for example, high fabrication cost, fragile packaging and high sensitivity to environmental change. Also, these devices have a slow recovery time, caused by their reliance on Brownian movement for returning dipole particles to an unoriented condition.

Recently a new light-control approach substantially avoiding the above-mentioned problems and disadvantages was disclosed by L. F. Frank and J. Y. Kaukeinen in *Research Disclosure* No. 15535, Vol. 155, pp. 64–71, March, 1977, published by Industrial Opportunities Ltd., Homewell, Havant, Hampshire, PO9 IEF, United Kingdom. This new concept provides a light-control device in which a plurality of light-control elements are dispersed in an elastomeric matrix. As in the prior liquid systems, the light-control elements of this new device have a configuration which can provide both a relatively small and a relatively large obstruction to the passage of light, i.e., having large and small silhouettes, and the dipole characteristic of aligning in a common orientation in an electric or magnetic field. However, in the new approach the elastomeric matrix restrains the elements from random movement within the layer and has an elasticity which allows orientation of the elements under the influence of the field. Upon termination of the field, the elements are quickly returned to their retained orientation by restoring forces of the elastic matrix. The elements disclosed in the aforementioned publication can be employed for area-wise light control, e.g., as camera shutters, or can be used in cooperation with various imagewise field producing means, e.g., a photoconductor, a discharge stylus, or a patterned electrode, to provide new and useful image display panels.

This new approach, utilizing dipole particles in a solid elastomeric material, affords many operational and fabrication advantages; however, in some instances, difficulties have been encountered because of irregularities in the size, shape and/or distribution of the light-control elements.

SUMMARY OF THE INVENTION

The present invention is concerned with new constructions for elastomeric light-control devices which minimize such irregularities and provide improved performance characteristics, and which, in some embodiments, afford additional light-control capabilities.

Thus, it is an object of the present invention to provide improved light-control devices of the type using dipole elements supported in an elastomeric matrix.

Another objective is to provide new methods for fabricating such devices which facilitate improved performance characteristics.

Other objectives of the present invention are to provide methods of manufacture and constructions which provide increased regularity in the size, shape and/or distribution of the light-control elements of such devices.

In general, the above objectives are accomplished in accordance with the present invention by forming an array of discrete light-control elements of predetermined physical characteristics including size and shape which are retained in a predetermined pattern and disposing the element array in an elastomeric matrix in a manner maintaining the relative positions of the elements. In accordance with another important aspect of the present invention, devices are provided having the light-control elements located within the elastomeric matrix as an array of discrete, predeterminedly-spaced particles which are predeterminedly distributed across the light-control area.

BRIEF DESCRIPTION OF THE DRAWINGS

The subsequent description of preferred embodiments refers to the attached drawings, in which.

DETAILED DESCRIPTION OF THE PREFERRED EMBODIMENTS

Figure 1:
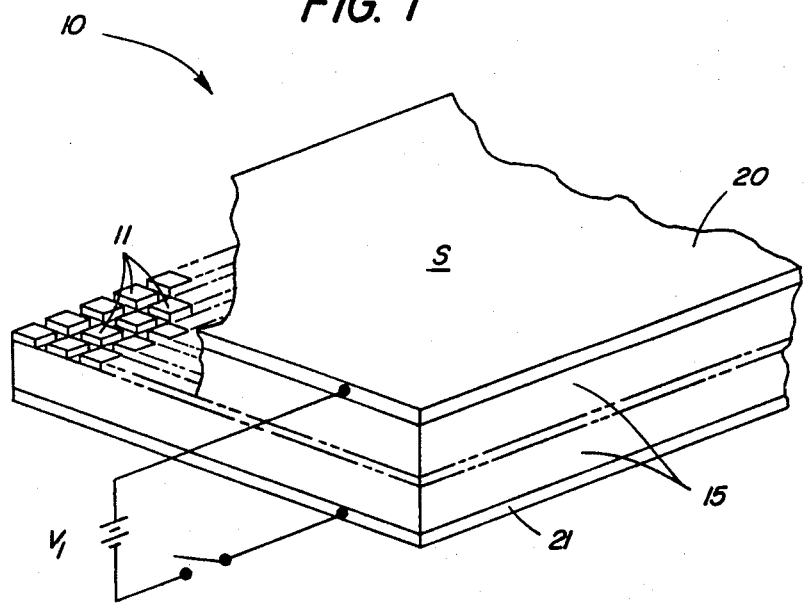
FIG. 1 is a perspective view, greatly enlarged, of a portion of a light-control device in accordance with one embodiment of the present invention.

The embodiment of light-control device 10 shown in FIG. 1 comprises an array of light-control elements 11 disposed in an elastomeric matrix 15 which is sandwiched between electrodes 20 and 21. The elements 11 are field-orientable and have large and small dimensions to provide, alternatively, large and small outlines, depending upon their orientation. When an electric field is presented across matrix 15, e.g., by application of a potential $V_1$ across electrodes 20 and 21, each light-control element 11 will rotate, generally on an internal axis parallel to surface S, from the orientation shown in FIG. 1, toward an orientation wherein its larger dimension is normal to surface S and parallel to the electric field across the matrix. That is the elements 11 will move toward a position rotated 90° from that illustrated, the extent of such rotation being dependent on the field magnitude.

Light directed toward surface S of the light-control device 10 will thus be affected differently depending on the field across the matrix. For example, if elements 11 are reflective, light will be substantially reflected when an electric field is not present and substantially unreflected by the elements 11 when they have been rotated 90° under field. If one of the electrodes 20 or 21 is imagewise addressable, for example an imagewise exposed photoconductor, the field created will have a corresponding image pattern and the elements 11 will selectively rotate in an image pattern corresponding to the field.

As will be appreciated from this general introductory discussion, the light-control elements 11 and the elastomeric matrix 15 constitute important features of devices according to the present invention, and they have certain characteristics in common with their counterparts in devices of the above-mentioned Frank and Kaukeinen disclosure. (The subject matter of that Research Disclosure is also the subject of U.S. patent application Ser. No. 682,305, entitled ACTIVE LIGHT CONTROL DEVICE and filed May 3, 1976 in the names of L. F. Frank and J. Y. Kaukeinen.) Thus certain teachings of the Frank and Kaukeinen publication and application are pertinent with respect to the present invention, and the publication and application are incorporated herein by this reference.

For example, as disclosed in the Frank and Kaukeinen publication, light-control elements of the present invention desirably are of shapes having an aspect (length/thickness) ratio greater than 2 and preferably in the range of 10 to 100. However, various shapes, besides the thin square elements shown in FIG. 1, can meet this requirement. For example such element types can be in the form of parallelograms, triangles, ellipsoids or other such shapes. It is often desirable to utilize an element shape, or a combination of element shapes, which maximizes coverage of the operative light-control area, i.e., which affects a large percentage of incident light when the elements are in a light-affecting orientation.

As mentioned, the light-control elements should be selected from materials which exhibit "dipolarity", which term, as used herein, includes: (1) elements having an inherent tendency to orient in a magnetic or electric field because of their molecular structure and (2) elements having a difference in dielectric constant from the matrix such that the tendency to orient can be field induced.

Optically, elements exhibiting various light-modifying effects are useful in practice of the present invention. For example, element types which are reflective, absorptive, high-index-scattering or depolarizing can be used, as well as element types having combinations of such characteristics. Various reflective metals, dielectric materials, iodine-containing crystalline materials or liquid crystal materials meet these optical requirements and exhibit dipolarity.

It is desirable also that the light-control elements have a maximum dimension less than 25 micrometers, preferably in the range of 0.1 to 1 micrometers; however, elements of larger dimension are operable (see, e.g., Examples I and II below). In image display uses, the image resolution desired will to a large extent dictate the element size selected, but other characteristics of a device should be considered in such selection. For example, for a given matrix, the field strength required for element rotation increases with increases in element size. Thus the element size should be determined considering the matrix material's elastic modulus and the voltage to be used.

In accordance with the present invention, the matrix should be formed of an elastomeric solid, i.e., in the solid phase state at the temperatures of intended storage and use conditions. In many applications it is desirable also that the matrix be highly light transmissive. The matrix should have a modulus of elasticity sufficiently low to facilitate orienting movement of the particles under readily attainable field-forces. Elastomeric materials whose Young's modulus is in the range of about $1 \times 10^{-1}$ p.s.i. to $1 \times 10^{-3}$ p.s.i. meet this requirement.

In embodiments utilizing an electric orienting field, the matrix is desirably electrically insulative to an extent preventing any substantial current flow at operating voltages. Thus, the modulus of elasticity and electrical resistivity should be matched to allow orienting movement under field without electrical breakdown across the layer. An elastomeric material having a resistivity of about $10^{15}$ ohm-cm has been found to work well in the operating voltage ranges subsequently described; however, dielectric coatings or laminations can be used with more conductive matrix materials to prevent field breakdown.

In connection with the aforementioned matrix material attributes, low modulus of elasticity silicone rubbers have been found particularly useful in many embodiments of the present invention. However, other elastomeric materials such as, for example, polyurethanes are useful in the practice of the invention.

Considering further the embodiment of the present invention shown in FIG. 1, it will be noted that all light-control elements 11 are substantially identical in size and shape. Additionally, it will be noted that in accordance with this embodiment of the present invention, the elements 11 are uniformly distributed across the matrix and, further, the elements are substantially coplanar.

Each of the above features individually, and in combination, contributes to significant enhancements in the light control provided by the FIG. 1 embodiment of the invention. For example the coplanar elements 11 are affected more uniformly by orienting fields than are the non-coplanar elements of prior art devices. Regular distribution of elements 11 across the operative light-control area equalizes the light control effects imparted at the different zones within that area. Uniformity of element size and shape further enhances the uniformity of the elements' field response and light-control effect. In image display devices, the foregoing features each contribute to significant improvements in resolution and contrast.

Figure 2:
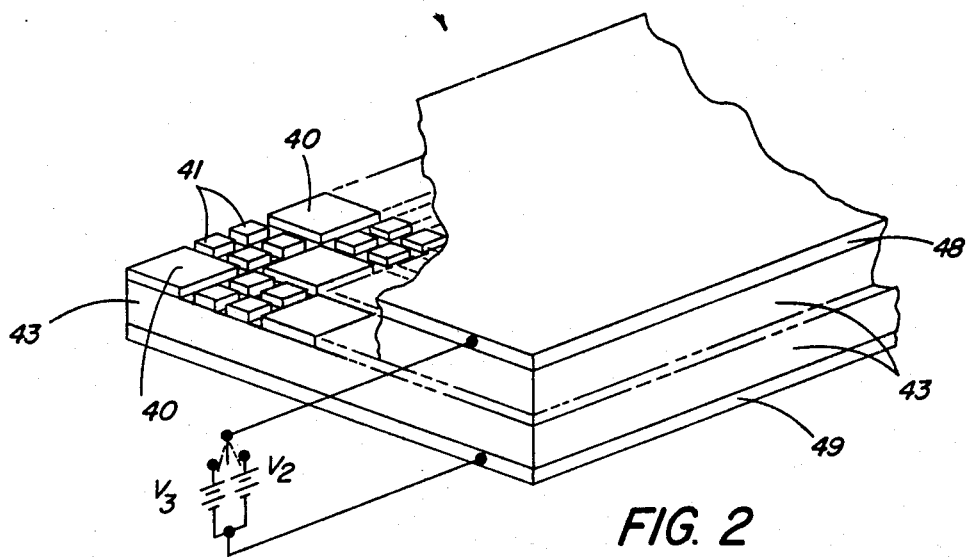
FIG. 2 is a similar perspective view of a portion of another light-control device, in accordance with an alternative embodiment of the present invention.

In accordance with an alternative embodiment of the present invention shown in FIG. 2, the light control elements can be predeterminedly different in size and distributed across the operative area of the device in a selected pattern to provide other advantageous results. Thus, in matrix 43 of device 30, the light-control elements 40 have interspersed therebetween, four smaller light-control elements 41. With embodiments of the invention such as shown in FIG. 2, selective rotation of only the smaller elements 41 can be implemented by application of a low threshold voltage $V_2$ across the electrodes 48, 49. That is, in a given matrix, smaller elements require less field for rotation than larger elements; thus a voltage $V_2$ can be selected which will effect substantial rotation of elements 41 but not cause any significant rotation of elements 40. Larger voltage $V_3$ normally would be provided to effect rotation of all elements, i.e., 40 and 41.

Devices such as shown in FIG. 2 can be utilized for various useful light control effects. For example such a device can be used as a camera diaphragm (or diaphragm-shutter) to modulate the quantity of light for an exposure of photosensitive material, i.e., allowing part of the light to pass in bright scene conditions (elements 41 only rotated) and more to pass in low scene light (all elements rotated). Alternatively, the elements 40 and 41 can have different light-affecting characteristics, e.g., color, with the voltage being regulated to achieve different desired display effects. Many other uses for devices of the type shown in FIG. 2 will be readily occur to one skilled in the art. Of course it will be appreciated that more than two different sizes of elements can be utilized, with the device having a corresponding number of different voltage levels. Also, it will be appreciated that many other element shapes, area patterns and light-control effects can be utilized within the scope of this aspect of the invention.

Having described examples of the highly useful structures achieved in accordance with the present invention, we will now describe the unique and advantageous techniques which we have discovered for making such devices.

The general approach of these techniques is to preform the desired array, of predeterminedly located and configured elements, in a manner which enables the disposition of the elements in the elastomeric matrix without change of their relative positions within the array. We have found photofabrication a highly desirable technique for this purpose. For example, using photofabrication we can: (a) provide a support having a planar surface bearing a substantially continuous layer of light-control material; (b) form a substantially continuous coating of photoresist material on the layer; (c) expose the coating to a fine-grid light pattern; (d) process the coating to remove portions thereof in accordance with the light pattern; (e) etch the uncoated portions of the layer to provide a plurality of discrete, coplanar, light-control elements on the support; and (f) dispose the light-control elements in an elastomeric matrix with the same relative positions as existed on the support. If the original support is elastomeric matrix material, the final step can be accomplished by applying another layer of elastomer over the array. Alternatively the support can be of another type material and the array transferred in position to an elastomer layer, then overcoated. In certain applications an overcoat layer may not be necessary.

The following detailed examples further illustrate the approach outlined above.

EXAMPLE I

A degassed mixture of RTV 619A Silicone Potting Gel, RTV 619B Curing Agent and RTV 910 Diluent (commercially available products of General Electric Company) in the ratio of 10:1:10 by weight is coated, in a 6-mil layer, onto the surface of an electrically-conductive glass plate. The coating is cured at 100° C. for two hours to form a tacky, clear and elastic resin layer. Onto this silicone resin layer is laid a piece of aluminum foil 0.285-mil thick (Alcoa: 1145-H19), which has been coated on its matte surface with a thin film of SS4155 Blue Silicone Primer (General Electric). The foil-elastomer bond is allowed to dry in air for several minutes.

The device is then dipped into a solution containing equal parts of Kodak Micro-Resist 747(110 centistrokes) photoresist and Kodak Micro-Neg resist thinner, and slowly withdrawn to produce a uniform photoresist coating. After prebaking in a conventional manner, the coating is exposed in a contact printing frame through a wire-mesh screen. The coating is then spray developed, rinsed and postbaked in a conventional manner. The device is next placed in concentrated phosphoric acid (50° C.) for approximately 45 minutes to etch the foil portions which are not protected by the photoresist. After etching, an array of foil squares 4.5-mil wide and with center-to-center spacing of 5 mils is present on the surface. These squares are flat, substantially coplanar and highly light-reflective. The array is then overcoated with another 6-mil layer of the resin mixture described above, and cured. The metal squares thus reside in a plane between two 6-mil layers of the silicone matrix. Atop the device, i.e., on the side opposite the conductive glass, is placed a 4-mil sheet of Estar film base (Eastman Kodak Co.), the upper surface of which bears a transparent conductive coating.

When a potential is applied across the matrix, using the conducting surfaces as electrodes, the aluminum squares rotate about an axis lying in the plane of their original disposition. Onset of this rotation is noted at 1 kV and the rotation angle increases with increasing applied voltage. Removal of the potential causes the aluminum squares to return to their original planar orientation such as shown in FIG. 1. With the aluminum squares rotated, the specular reflectivity of the flake layer is reduced significantly below that occurring at the electrode interfaces. At 1.5 kV the light reflected from an argon laser beam, incident a few degrees from normal to the plane of the device (surface S shown in FIG. 1), is reduced by a factor of 30 from that reflected with no voltage across the device.

EXAMPLE II

A piece of unsubbed, 4-mil Estar film base (Eastman Kodak Co.) is aluminized by vapor deposition to a thickness of 8000 Å. The metallized sheet is photoresist coated, exposed and processed as in the preceding example, then placed in concentrated phosphoric acid (50° C.) for 15 minutes to remove the metal not protected by the resist. After etching, a pattern of aluminum squares 4.5-mil wide and with center-to-center spacing of 5 mils is present on the surface.

The metallized side of the sheet is laid into contact with the resin-coated surface of a conductive glass plate, prepared as described in the preceding example. This composite unit is then placed in a container of hexafluoroisopropanol (HFIP). Over the course of one to two hours, this fluid dissolves the sheet leaving the aluminum squares adhering to the resin layer. These squares are flat and highly reflective. After removal from the HFIP, the element-bearing layer is allowed to air dry for several minutes.

After such drying, the element-bearing surface of the resin layer is overcoated with additional resin, cured and the upper electrode is affixed, all just as described in the preceding example. Electrical behavior is essentially the same as that of the device prepared using the foil.

Instead of aluminum, other reflective materials have been used. For instance, the procedure described in this Example ws modified by using a silver layer evaporated on glass. After photoprocessing as described, the silver was etched in Farmers Reducer oxidizing agent (Eastman Kodak Co.) and the glass was dissolved in hydrofluoric acid. In this embodiment, both electrodes were conductively coated films and a flexible device was produced.

It will be appreciated that this aspect of the present invention is not limited to photofabrication techniques. That is, other techniques can be used to dissect a continuous light-control layer, carried by a support, into an array of discrete light-control elements. For example the continuous layer can be releasably adhered to a rigid support, dissected in accordance with a predetermined pattern by a scanning laser and transferred to the elastomeric matrix.

Also it will be appreciated that, within the scope of the invention, the light-control elements can be formed in a predetermined array pattern within such matrix with their longitudinal axes generally normal to the incident light surface, rather than parallel to that surface as shown in FIGS. 1 and 2. In such an embodiment the electrodes would be constructed and located to provide, when energized, a field that rotates the elements toward their light affecting position, i.e., longitudinal axes parallel to the incident light surface.

The invention has been described in detail with particular reference to certain preferred embodiments thereof, but it will be understood that variations and modifications can be effected within the spirit and scope of the invention.

What is claimed is:

1. A method of manufacturing a light-control device, said method comprising:
    (a) forming an array comprising a plurality of discrete light-control elements, each of said elements being located in a precisely predetermined position relative to the other of said elements; and
    (b) disposing said array in an elastomeric matrix in a manner maintaining such predetermined positional relation of said elements.

2. A method of manufacturing a light-control device, said method comprising:
    (a) providing a surface with a substantially continuous layer of light-control material supported thereon;
    (b) dissecting said layer into an array of discrete light-control elements in a manner maintaining the relative positions of said elements on said surface; and
    (c) disposing said array in a solid elastomeric matrix with the elements thereof in substantially the same relative positions as existed on said surface.

3. The invention defined in claim 2 wherein said layer is dissected into an array of predeterminedly interspaced elements.

4. The invention defined in claim 3 wherein said layer is substantially flat and said elements are disposed in said matrix in a substantially coplanar relation.

5. The invention defined in claim 2 wherein said layer is dissected into an array of predeterminedly sized and shaped elements which are regularly distributed across said surface.

6. The invention defined in claim 5 wherein said surface is substantially flat and said elements are disposed in said matrix in a substantially coplanar relation.

7. The invention defined in claim 2 further comprising the step of affixing electrodes with respect to said matrix, on opposite sides of said element array.

8. The invention defined in claim 2 wherein said layer is substantially flat and is dissected into substantially identically sized and shaped elements which are substantially coplanar and uniformly distributed across said surface.

9. The invention defined in claim 2 wherein said layer is substantially flat and is dissected into elements of at least two predeterminedly different types arranged in a regular pattern across said surface.

10. The invention defined in claim 9 wherein the different element types differ in size.

11. A method of manufacturing a light-control device, said method comprising:
    (a) providing a substantially continuous layer of light-control material which extends across an operative area and which bears a substantially continuous coating that is light sensitive and processable to provide protective portions;
    (b) exposing said coating to a light pattern selected in accordance with the desired light-control characteristic of said device;
    (c) processing said exposed coating to provide, on said layer, a pattern of protective portions in accordance with said light pattern;
    (d) dissolving unprotected portions of said layer to provide an array of discrete, coplanar, light-control elements which are sized, shaped and distributed across said area in accordance with said light pattern; and
    (e) disposing said array, with the elements substantially in situ, in an elastomeric matrix.

12. The invention defined in claim 11 wherein said layer is affixed to an elastomeric support during said exposing, processing and dissolving steps.

13. The invention defined in claim 12 wherein said disposing step comprises coating another layer of elastomeric material over said array.

14. The invention defined in claim 11 wherein said layer is affixed to a support during said exposing, processing and dissolving steps.

15. The invention defined in claim 14 wherein said disposing step includes forming an elastomeric coating on said array and removing said support.

16. The invention defined in claim 11 further comprising affixing electrodes with respect to said matrix on opposite sides of said array.

17. A method of manufacturing a light-control device, said method comprising:
    (a) providing a support having a generally planar surface bearing a substantially continuous layer of light-reflective metal;
    (b) forming a substantially continuous coating of photoresist material on said layer;
    (c) exposing said coating to a fine-grid light pattern;
    (d) processing said coating to remove portions of said coating in accordance with said light pattern;
    (e) etching the uncoated portions of said layer to provide a plurality of discrete, coplanar, light-control elements on said support; and
    (f) disposing said light-control elements in an elastomeric matrix with the same relative positions as existed on said support.

18. The invention defined in claim 17 wherein said light pattern exposes said coating in a manner effecting segmenting of said layer into elements of predetermined shape and size, which are distributed across said support surface in a regular pattern.

19. In a light-control device of the type including a solid elastomeric matrix and a plurality of discrete light-control elements supported by said matrix, the improvement wherein said light-control elements are distributed across said matrix in a precise spacial relation forming a predetermined element pattern.

20. The invention defined in claim 19 wherein said light-control elements are coplanar.

21. The invention defined in claim 19 wherein said light-control elements are predeterminedly sized and shaped.

22. The invention defined in claim 19 wherein said elements are identical in size and shape and are equidistantly spaced across said matrix.

23. The invention defined in claim 19 wherein said elements include at least two different element types, elements of one of said types being interspersed with elements of said other of said types in a regular pattern across said matrix.

24. The invention defined in claim 23 wherein said different element types differ in size.

25. In a light-control device of the type having a solid elastomeric matrix and a plurality of discrete, light-control elements supported across said matrix, the improvement wherein said elements are substantially identical in size and shape and are substantially coplanar and uniformly distributed across said matrix.

26. In a light-control device of the type having a solid elastomeric matrix, a plurality of discrete, field-orientable, light-control elements supported within said matrix and electrode means sandwiching said matrix therebetween, the improvement wherein said light-control elements are predeterminedly sized and shaped and supported in said matrix in a precisely predetermined, coplanar spacial relation.

27. An active light-control device comprising:
(a) first and second planar electrodes, at least one of said electrodes being substantially light transparent;
(b) a solid elastomeric matrix between, and generally coextensive with, said electrodes, said matrix having a Young's modulus in the range of about 0.1 to 0.001 pounds per inch$^2$; and
(c) an array of discrete, coplanar light-control particles supported in said matrix, said particles being predeterminedly sized and shaped and located across said matrix in a precise spacial relation forming a regular pattern.

* * * * *